United States Patent
Schneider et al.

(10) Patent No.: US 6,225,413 B1
(45) Date of Patent: May 1, 2001

(54) THERMOPLASTIC MOULDING COMPOUNDS

(75) Inventors: Michael Schneider, Neustadt; Josef Wünsch, Schifferstadt; Hermann Gausepohl, Mutterstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/341,320

(22) PCT Filed: Dec. 19, 1997

(86) PCT No.: PCT/EP97/07167

§ 371 Date: Jul. 8, 1999

§ 102(e) Date: Jul. 8, 1999

(87) PCT Pub. No.: WO98/30630

PCT Pub. Date: Jul. 16, 1998

(30) Foreign Application Priority Data

Jan. 9, 1997 (DE) .............................................. 197 00 306

(51) Int. Cl.[7] ...................................................... C08L 25/02

(52) U.S. Cl. .............................................................. 525/241
(58) Field of Search ............................................... 525/241

(56) References Cited

U.S. PATENT DOCUMENTS 5,306,790  4/1994  Imabayashi et al. .
5,854,353  * 12/1998  Knoll et al. .......................... 525/314

FOREIGN PATENT DOCUMENTS 732 359    9/1996   (EP) .
535 582    12/1996  (EP) .
95/34586   12/1995  (WO) .

* cited by examiner

Primary Examiner—N. Nutter
(74) Attorney, Agent, or Firm—Keil & Weinkauf

(57) ABSTRACT

A thermoplastic molding material containing

A) from 5 to 95% by weight of a vinylaromatic polymer having a syndiotactic structure and B) from 5 to 95% by weight of a copolymer of a vinylaromatic monomer and 1,1-diphenylethylene or its derivatives which may be substituted on the aromatic rings by alkyl of up to 22 carbon atoms.

6 Claims, No Drawings

THERMOPLASTIC MOULDING COMPOUNDS

This application claims the benefit under 35 U.S.C. 371 prior PCT International Application No. PCT/EP 97/07167 which has an International filing date of Dec. 19, 1997.

The present invention relates to thermoplastic molding materials containing

A) from 5 to 95% by weight of a vinylaromatic polymer having a syndiotactic structure and B) from 5 to 95% by weight of a copolymer of a vinylaromatic monomer and 1,1-diphenylethylene or its derivatives which may be substituted on the aromatic rings by alkyl of up to 22 carbon atoms.

BACKGROUND OF THE INVENTION

1. Field of the Invention

The present invention furthermore relates to the use of the thermoplastic molding materials for the production of fibers, films and moldings and to the fibers, films and moldings produced therefrom.

Owing to its crystallinity, syndiotactic polystyrene has a very high melting point of about 270° C., high rigidity and tensile strength, dimensional stability, a low dielectric constant and high resistance to chemicals. The mechanical property profile is retained even at temperatures above the glass transition temperature. The preparation of syndiotactic polystyrene in the presence of metallocene catalyst systems is known and is described in detail, for example, in EP-A 0 535 582.

Owing to the remaining amorphous fraction in the syndiotactic polystyrene, the glass transition temperature is only about 100° C.

2. Description of the Related Art

EP-A 0 732 359 and WO 95/34586 describe thermoplastic molding materials comprising copolymers of vinylaromatic monomers and 1,1-diphenylethylene and further polymers, such as polyphenylene ether or transparent high impact polystyrene having glass transition temperatures above 130° C. However, these molding materials do not reach the high heat distortion resistance of molding materials which contain syndiotactic polystyrene and, in the case of blends with polyphenylene ether, tend to yellow.

BRIEF SUMMARY OF THE INVENTION

It is an object of the present invention to remedy the stated disadvantages and to provide thermoplastic molding materials which have a high glass transition temperature and are stable to high temperatures, dimensionally stable, have high rigidity and low electrical conductivity and do not tend to yellow.

DETAILED DESCRIPTION OF THE INVENTION

We have found that this object is achieved by the thermoplastic molding materials defined at the outset.

We have also found the use of the thermoplastic molding materials for the production of fibers, films and moldings as well as the fibers, films and moldings obtainable therefrom.

The novel thermoplastic molding materials contain, as component A), from 5 to 95, preferably from 10 to 75, in particular from 25 to 75, % by weight of a vinylaromatic polymer having a syndiotactic structure. Here, the expression "having a syndiotactic structure" means that the polymers are essentially syndiotactic, ie. the syndiotactic fraction as determined according to $^{13}C$-NMR, is greater than 50%, preferably greater than 60%.

The component A) is preferably composed of compounds of the general formula I $$R^1-C=CH_2$$

(with aromatic ring bearing $R^2$, $R^3$, $R^4$, $R^5$, $R^6$) (I)

where:

$R^1$ is hydrogen or $C_1$–$C_4$-alkyl, $R^2$ to $R^6$ independently of one another, are each hydrogen, $C_1$–$C_{12}$-alkyl, $C_6$–$C_{18}$-aryl, or halogen, or two neighboring radicals together are a cyclic group of 4 to 15 carbon atoms, for example $C_4$–$C_8$-cycloalkyl or a fused ring system.

Vinylaromatic compounds of the formula I where $R^1$ is hydrogen are preferably used.

Particularly suitable substituents $R^2$ to $R^6$ are hydrogen, $C_1$–$C_4$-alkyl, chlorine, phenyl, biphenyl, naphthalene and anthracene. Two neighboring radicals together may furthermore be a cyclic group of 4 to 12 carbon atoms, resulting, for example, in naphthalene derivatives or anthracene derivatives as compounds of the general formula I.

Examples of such preferred compounds are:

styrene, p-methylstyrene, p-chlorostyrene, 2,4-dimethylstyrene, 4-vinylbiphenyl, vinylnaphthalene and vinylanthracene.

Mixtures of different vinylaromatic compounds may also be used, but only one vinylaromatic compound is preferably used.

Particularly preferred vinylaromatic compounds are styrene and p-methylstyrene.

Mixtures of different vinylaromatic polymers having a syndiotactic structure may also be used as component A), but preferably only one vinylaromatic polymer is used, in particular syndiotactic polystyrene (s-PS).

Vinylaromatic polymers having a syndiotactic structure and processes for their preparation are known per se and are described, for example, in EP-A 535 582. In the preparation, a preferred procedure comprises reacting compounds of the general formula I in the presence of a metallocene complex and of a cocatalyst. In particular, pentamethylcyclopentadienyltitanium trichloride, pentamethylcyclopentadienyltitanium trimethyl and pentamethylcyclopentadienyltitanium trimethylate are used as metallocene complexes.

The vinylaromatic polymers having a syndiotactic structure generally have a weight average molecular weight $M_w$ of from 5000 to 10,000,000, in particular from 10,000 to 2,000,000 g/mol. The molecular weight distributions $M_w/M_n$ are in general from 1.1 to 30, preferably from 1.4 to 10.

The thermoplastic molding materials contain, as component B), from 5 to 95, preferably from 25 to 90, in particular from 25 to 75, % by weight of a copolymer of a vinylaromatic monomer and 1,1-diphenylethylene or its derivatives which may be substituted on the aromatic rings by alkyl of up to 22 carbon atoms. Particularly suitable copolymers are those having a content of 1,1-diphenylethylene or its derivatives which is chosen so that the copolymer is readily compatible with the component A). This is evident, for example, from the fact that the blend with the component A) has a single glass transition temperature and can be readily determined by thermal analysis methods, for example DSC (differential scanning calorimetry). Advantageously, the copolymer contains from 5 to 65, preferably from 10 to 45, and very particularly preferably from 15 to 25, % by weight of 1,1-diphenylethylene or the corresponding molar amount of a derivative derived from 1,1-diphenylethylene. The weight average molecular weight $M_w$ of the component A is from 10,000 to 2,000,000 g/mol, preferably from 20,000 to 1,000,000 and very particularly preferably from 50,000 to 500,000, g/mol.

The copolymers which may be used as component B) are known per se. Their preparation is described in detail in DE-A 44 36 499 (= WO 95/34586).

The sum of the components A) and B) is 100% by weight.

If required, additives or processing assistants or mixtures thereof may be added in conventional amounts to the novel thermoplastic molding materials.

These are, for example, nucleating agents such as salts of carboxylic, organic sulfonic or phosphoric acids, preferably sodium benzoate, aluminum tris(p-tert-butylbenzoate), aluminum trisbenzoate, aluminum tris(p-carboxymethylbenzoate) and aluminum triscaproate; antioxidants such as phenolic antioxidants, phosphites or phosphonites, in particular trisnonylphenyl phosphite; stabilizers such as sterically hindered phenols and hydroquinones. Lubricants and mold release agents, dyes, pigments and plasticizers may also be used.

Organophosphorus compounds, such as phosphates or phosphine oxides may be used as flameproofing agents.

Examples of phosphine oxides are triphenylphosphine oxide, tritolylphosphine oxide, trisnonylphenylphosphine oxide, tricyclohexylphosphine oxide, tris-(n-butyl) phosphine oxide, tris-(n-hexyl)phosphine oxide, tris-(n-octyl)phosphine oxide, tris(cyanoethyl)phosphine oxide, benzylbiscyclohexylphosphine oxide, benzylbisphenylphosphine oxide and phenylbis-(n-hexyl)phosphine oxide. Triphenylphosphine oxide, tricyclohexylphosphine oxide, tris-(n-octyl)phosphine oxide and tris(cyanoethyl)phosphine oxide are particularly preferably used.

Particularly suitable phosphates are alkyl- and aryl-substituted phosphates. Examples are phenyl bisdodecyl phosphate, phenyl bisneopentyl phosphate, phenyl ethyl hydrogen phosphate, phenyl bis(3,5,5-trimethylhexyl) phosphate, ethyldiphenyl phosphate, bis(2-ethylhexyl) p-tolyl phosphate, tritolyl phosphate, trixylyl phosphate, trimesityl phosphate, bis(2-ethylhexyl) phenyl phosphate, tris(nonylphenyl) phosphate, bisdodecyl p-tolyl phosphate, tricresyl phosphate, triphenyl phosphate, dibutylphenyl phosphate, p-tolyl bis(2,5,5-trimethylhexyl) phosphate and 2-ethylhexyl diphenyl phosphate. Phosphorus compounds in which each R is an aryl radical are particularly suitable. Triphenyl phosphate, trixylyl phosphate and trimesityl phosphate are very particularly suitable. Cyclic phosphates may also be used. Particularly suitable here is diphenyl pentaerythrityl diphosphate. Resorcinol diphosphate is also preferred.

Mixtures of different phosphorus compounds may also be used.

For toughening, elastomeric polymers may added to the novel thermoplastic molding materials.

These elastomeric polymers and processes for their preparation are known per se and are described, for example, in DE-A 41 29 499.

Graft rubbers having a crosslinked, elastomeric core and a graft shell comprising polystyrene, and EP and EPDM rubbers, block copolymers and thermoplastic polyester elastomers, may be mentioned here merely by way of example.

Appropriate products are also commercially available, for example a polyoctylene having the name Vestenamer® (Hüls AG), and a large number of suitable block copolymers having at least one vinylaromatic and one elastomeric block. The Cariflex®-TR types (Shell), the Kraton®-G types (Shell), the Finaprene® types (Fina) and the Europrene®-SOL types (Enichem) may be mentioned by way of example.

Block copolymers are preferably used.

The novel thermoplastic molding materials may furthermore contain fibrous or particulate fillers or mixtures thereof.

These are, for example, carbon fibers or glass fibers, glass mats, glass rovings or glass beads as well as potassium titanate whiskers or aramid fibers, preferably glass fibers. Glass fibers may be provided with a size and an adhesion promoter. These glass fibers can be incorporated both in the form of short glass fibers and in the form of rovings. Preferred glass fibers contain an aminosilane size.

Amorphous silica, magnesium carbonate, powdered quartz, mica, talc, feldspar or calcium silicates may furthermore be used.

The novel thermoplastic molding materials can be obtained by mixing the individual components at from 270 to 320° C. in a conventional mixing apparatus, such as a kneader, a Banbury mixer or a single-screw extruder, but preferably in a twin-screw extruder. Thorough mixing is necessary for obtaining a very homogeneous molding material. The order in which the components are mixed may be varied, for example two, or if required more components may be premixed, but it is also possible to mix all components together.

The novel thermoplastic molding materials are distinguished by high heat distortion resistance and high rigidity. They are suitable for the production of fibers, films or moldings.

EXAMPLES

The following components were used
Component A)

An s-PS having $M_w$=320,800, $M_w/M_n$=2.1 and a syndiotactic fraction of >90% according $^{13}$C-NMR, which was prepared as follows:

1.0 mol of styrene (104.2 g) was initially taken in a round-bottom flask flushed with nitrogen to provide an inert atmosphere and was heated to 60° C., and 8.16 ml of methylaluminoxane (MAO) solution from Witco (1.53 molar in toluene) and 2.08 ml of diisobutylaluminum hydride (DIBAH) (1.0 molar in cyclohexane) from Aldrich were added. 9.5 mg (4.16·10$^{15}$ mol) of pentamethylcyclopentadienyl titanium trimethyl were then added to the mixture. The internal temperature was adjusted to 60° C. and polymerization was carried out for 2 hours. The polymerization was then stopped by adding methanol. The polymer obtained was washed with methanol and dried at 50° C. under reduced pressure. Molar masses and molar mass distribution were determined by high-temperature GPC (gel permeation chromatography) using 1,2,4-trichlorobenzene as the solvent at 1350° C. The calibration was carried out using polystyrene standards having a narrow distribution.

The conversion was 73%, based on the styrene used.
Components B)

Purification of 1,1-diphenylethylene (DPE)

Crude DPE (Aldrich or preparation by reaction of phenylmagnesium bromide with acetophenone, acetylation with acetic anhydride and thermal elimination of acetic acid) was distilled over a column having at least 50 theoretical plates (spinning band column; column containing Sulzer packings for larger amounts) to a purity of 99.8%. The generally slightly yellow distillate was filtered over a 20 cm Alox column (Woelm-Alumina for the chromatography, anhydrous), titrated with 1.5 N sec-butyllithium until a strong red color was obtained and distilled over a single bridge under reduced pressure (at 1 mbar) and stored under inert conditions. The product thus obtained is completely colorless and can be used directly in the anionic polymerization.

Polymerization

Solutions containing living anions were invariably handled under very pure nitrogen. The solvents were dried over anhydrous alumina.

In the examples which follow, S is Styrol and DPE is 1,1-diphenylethylene and the data in % are by weight, unless stated otherwise.

Component B1

(S/DPE copolymer containing 15% of DPE)

Before being filled, a 10 l stirred kettle was pretreated for several hours with a solution of DPE/sec-butyllithium in cyclohexane under reflux.

3760 ml of cyclohexane and 586 ml (600 g; 3.33 mol) of 1,1-diphenylethene were initially taken and titrated with sec-butyllithium until a red color was obtained. 72.4 ml of a 0.27 M sec-butyllithium solution in cyclohexane were then added and the mixture was heated to 70° C. 3748 ml (3400 g; 32.7 mol) of styrene were then added in 200 ml steps every 10 minutes. After a subsequent reaction time of 180 minutes, the mixture was titrated with ethanol until it became colorless, the polymer was precipitated by dropping the polymer solution into ethanol and the white powder was filtered, washed several times with ethanol and dried for 2 hours at 200° C. under reduced pressure (1 mbar).

Yield: 3948 g (98.7%); styrene content (FTIR): 85.1% (85% of theory); DPE content (FTIR): 14.9% (15% of theory); TG (DSC): 121.5° C. (width of the glass stage: 9° C.); molar masses (GPC, polystyrene calibration, g/mol): $M_n$ 177,000, $M_w$ 245,000.

Component B2

(S/DPE copolymer containing 30% of DPE)

The preparation of component B2 was carried out as described for component B1, 3086 ml (2800 g; 26.88 mol) of styrene and 1173 ml (1200 g; 6.66 mol) of 1,1-diphenylethene being used. Initiation was effected with 50 ml of 0.32 molar sec-buthyllithium solution in cyclohexane.

Yield: 3940 g (98.5%); styrene content (FTIR): 70.2% (70% of theory); DPE content (FTIR): 29.8% (30% of theory); TG (DSC): 141.7° C. (width of the glass stage: 10° C.); molar masses (GPC, polystyrene calibration, g/mol): $M_n$ 104,000, $M_w$ 193,000.

Component B3

(S/DPE copolymer containing 45% of DPE)

The preparation of component B3 was carried out as described for component B1, 2425 ml (2200 g; 21.12 mol) of styrene and 1759 ml (1800 g; 9.99 mol) of 1,1-diphenylethene being used. Initiation was effected with 39.6 ml of 0.295 molar sec-butyllithium solution in cyclohexane.

Yield: 3936 g (98.4%); styrene content (FTIR): 55.2% (55% of theory); DPE content (FTIR): 44.8% (45% of theory); TG (DSC): 159° C. (width of the glass stage: 90° C.); molar masses (GPC, polystyrene calibration, g/mol): $M_n$ 99,300, $M_w$ 188,000.

Examples 1 to 4

Preparation of the thermoplastic molding materials

The components stated in the table were compounded in a twin-screw extruder (ZSK 30 from Werner & Pfleiderer) at 290° C. The polymer melt was extruded and the extrudate was cooled in a water bath and granulated.

Comparative Examples V1 to V4

The procedure was as in Examples 1 to 4, the pure components B1, B2 and B3 (V1–V3) or a mixture of 50% of B2 and 50% of polyphenylene ether (PPE) in the case of V4 being used.

The heat distortion resistance was determined on the basis of the Vicat softening temperatures according to DIN 53 460. The injection temperature was 2900 and the mold temperature 150° C.

The glass transition temperature Tg was determined by means of DSC.

The compositions and properties of the thermoplastic molding materials are listed in the table.

The novel Examples 1 to 4 each show a substantial increase in the heat distortion resistance expressed in terms of Vicat A softening temperature, compared with the pure components B1, B2 and B3.

The test specimens from Comparative Experiment V4 have a slight yellow color which becomes more intense under UV irradiation and changes to a brown hue.

TABLE

|     | Composition [% by weight] | | | | TG | Vicat A |
| --- | --- | --- | --- | --- | --- | --- |
| Ex. | A) | B1) | B2) | B3) | [° C.] | [° C.] |
| 1   | 50 | 50 | —  | —  | 115 | 139 |
| 2   | 50 | —  | 50 | —  | 99/132 | 158 |
| 3   | 50 | —  | —  | 50 | 99/152 | 178 |
| 4   | 75 | —  | —  | 25 | 96/150 | 235 |
| V1  | —  | 100 | —  | —  | 125 | 116 |
| V2  | —  | —  | 100 | —  | 141 | 130 |
| V3  | —  | —  | —  | 100 | 157 | 145 |

We claim:

1. A thermoplastic molding material containing
   A) from 5 to 95% by weight of a vinylaromatic polymer having a syndiotactic structure and
   B) from 5 to 95% by weight of a copolymer of a vinylaromatic monomer and 1,1-diphenylethylene or its derivatives which may be substituted on the aromatic rings by alkyl of up to 22 carbon atoms.

2. A thermoplastic molding material as claimed in claim 1, containing
   the component A) in an amount of from 10 to 75% by weight and
   the component B) in an amount of from 25 to 90% by weight.

3. A thermoplastic molding material as claimed in claim 1, in which the amount of 1,1-diphenylethylene or its derivatives in the components B) is chosen so that the blend with component A) has a single glass transition temperature determined by differential scanning calorimetry.

4. A thermoplastic molding material as claimed in claim 1, in which the component A) consists of syndiotactic polystyrene.

5. A thermoplastic molding material as claimed in claim 1, in which the component B) is a copolymer of styrene and 1,1-diphenylethylene.

6. A fiber, film or molding comprising a thermoplastic molding material containing
   A) from 5 to 95% by weight of a vinvlaromatic polymer having a syndiotactic structure and
   B) from 5 to 95% by weight of a copolymer of a vinylaromatic monomer and 1,1-diphenylethylene or its derivatives which may be substituted on the aromatic rings by alkyl of up to 22 carbons,
as an essential component.

* * * * *